Dec. 30, 1952     F. M. PRUCHA     2,623,974
PROCESS FOR EXTRUDING FLANGES AROUND HOLES
IN METAL SHEETS AND WELDING NUTS THERETO
Filed Oct. 25, 1949

Inventor
Frank M. Prucha
By Willits, Helmig & Baillio
Attorneys

Patented Dec. 30, 1952

2,623,974

UNITED STATES PATENT OFFICE 2,623,974

PROCESS FOR EXTRUDING FLANGES AROUND HOLES IN METAL SHEETS AND WELDING NUTS THERETO

Frank M. Prucha, Birmingham, Mich., assignor to General Motors Corporation, Detroit, Mich., a corporation of Delaware Application October 25, 1949, Serial No. 123,414

17 Claims. (Cl. 219—10)

This invention relates to a process for extruding flanges around holes in metal sheets and welding nuts to the flanges and to the portions of the sheets adjacent the holes.

It is common practice to secure special nuts, which have projections formed on them, to metal sheets by welding operations, such operations usually being referred to as projection welding. One objection to the practice is that such nuts, because of having various shapes of projections formed on them, are special nuts and are necessarily more expensive than standard nuts of the same size.

In this invention, plain square nuts which are the least expensive type which can be bought, are employed and are secured to the metal sheet by being welded to a flange which is provided around the edge of a hole in the metal sheet, this flange being formed at the same time the hole is punched, by an extruding operation, the punch which serves to form the hole also serving to extrude the metal around the edge of the hole to form the flange.

The standard nut is then held in proper position against the end of the extruded flange, in an electrode and a welding current is caused to flow from the nut into the metal sheet, pressure being applied to the nut at the same time, with the result that the corners of the nut become embedded in and welded to the flange and the under surface of the corners of the nut also become welded to the upper surface of the metal sheet, thus producing a very strong connection which will withstand a maximum of twisting force.

Other objects and advantages of the invention will be apparent upon reference to the specification and accompanying drawing, in which.

Figure 1:
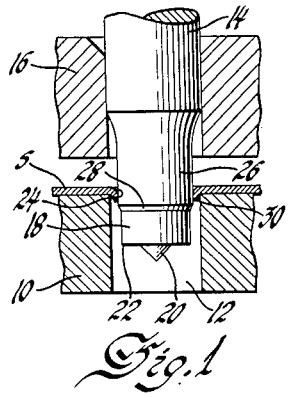
Figure 1 is a sectional view through a punch and die, showing the punching and extruding operation as applied to relatively thin sheet metal.

In the drawing, the metal sheet is referred to by the letter S, and the nut by the letter N.

Figure 2:
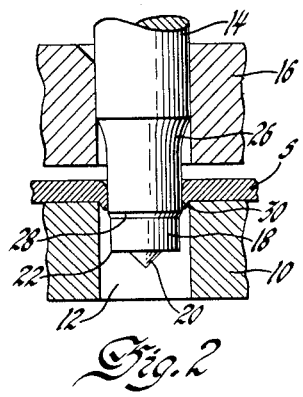
Figure 2 is a view similar to Figure 1, but showing the punching and extruding operations as applied to thicker sheet metal.

Referring to Figures 1 and 2, 10 indicates a die having a hole 12 formed therein, and 14 is a punch which is adapted to be reciprocated in a guide 16, these parts being mounted in a conventional punch press, which is not shown.

Formed on the lower end 18 of the punch, which end is of smaller diameter than the body of the die, is a conically-shaped point 20 which, when the punch is forced downwardly, engages the upper face of the sheet metal and forms a depression therein. Further downward movement of the punch brings the cutting edge 22 of the punch into contact with the metal sheet, which results in its piercing the latter and forcing out a slug to form the hole 24 in the metal sheet, the slug dropping downwardly through the hole 12 in the die.

It will be noted that the diameter of the lower end 18 of the punch is substantially smaller than the diameter of the hole 12 in the die, and since the diameter of the slug removed is substantially the same as the diameter of the end 18 of the punch, this results in the leaving of some of the metal sheet which projects inwardly beyond the edge of the hole 12.

Figure 3:
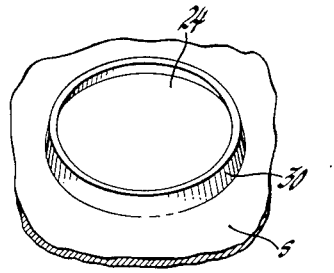
Figure 3 is a fragmentary perspective view of a sheet of metal, showing the flange which has been formed thereon by the punching and extruding operation.

The lower end 18 of the punch is connected to the body thereof by an intermediate portion 26 which is of slightly larger diameter than the end 18, and at the point where it merges with the latter, an inclined shoulder 28 is provided. As the punch descends further through the hole it has formed in the metal sheet, this inclined shoulder engages the inwardly projecting edge of the sheet, and causes it to become extruded downwardly into the hole 12, thereby resulting in the formation of a flange 30, which extends completely around the edge of the hole 24, as shown in Figure 3.

It will be seen that the flange is formed during the same operation as the hole is punched, thereby reducing the number of operations and the time required to perform them, and making it necessary to employ only a single set of dies and punches to do both things.

When utilizing the process on relatively thin sheet metal, the thickness of the flange which is extruded may be substantially the same as the thickness of the metal sheet, as shown in Figure 1, whereas when the process is being used on sheet metal of greater thickness, it becomes impracticable to do this and therefore only a relatively small portion of the edge of the metal sheet which projects inwardly beyond the edge of the hole 12 is extruded downwardly into the latter, with the result that the flange 30 which is formed in this case is of considerably less thickness than the thickness of the metal sheet, as shown in Figure 2. It will be noted, however, that the height of the flange which is formed remains substantially the same, regardless of the thickness of the metal sheet the process is being used upon. This is accomplished by proper proportioning of the punch and die sizes with respect to the thickness of the metal sheet being worked upon.

Figure 4:
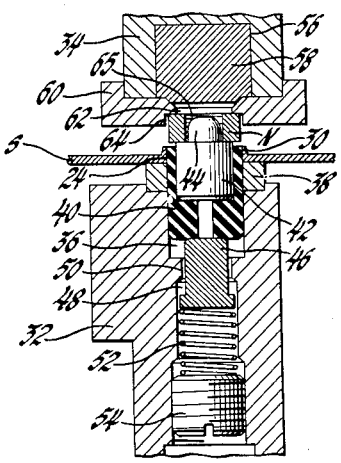
Figure 4 is a sectional view through the apparatus which serves to hold a nut in place over the metal sheet, preliminary to being welded thereto.

The next step is to locate the nuts in position for the welding operation. To do this, the metal sheet S is removed from the punch press, is turned over and as shown in Figure 4, is then inserted between a lower platen 32, and a welding adapter 34 which is removably secured in an upper platen (not shown) of a welding machine which is of conventional construction. The lower platen is stationary, but it will be understood that the upper one is adapted to be moved upwardly and downwardly, and that both platens are connected to a source of electrical power which is capable of providing a suitable welding current.

The lower platen 32 has a bore 36 formed therein, and secured to the upper face of this platen is a collar 38, the hole in the collar being of the same diameter as the bore 36 and being located concentrically therewith. Located within the bore and the collar, and free to slide vertically therein, is a sleeve 40 which is formed of any suitable insulating material. Mounted in the insulating sleeve is a locating pin 42 which has a rounded pilot portion 44 formed at its upper end.

The lower end of the insulating sleeve 40 rests upon the upper face of a plunger 46 which is mounted within a bore 48 provided in the lower platen 32, the plunger being guided for vertical sliding movement in a passageway 50 of reduced diameter extending from the bore 48 into the bore 36. The lower end of the plunger 46 is supported upon the upper end of a compression spring 52, the lower end of which abuts against a plug 54 which is threaded into the lower end of the platen 32.

Referring now to the welding adapter 34, this is provided with a cavity 56 in which is located a piece of material 58 which has the characteristic of retaining magnetic properties indefinitely, so that it is termed a permanent magnet. This is held in position in the cavity by means of a cap 60 which is pressed on or otherwise secured to the lower end of the adapter. This cap has a hole 62 and a counterbore 64 formed in it.

Normally the insulating sleeve 40 is in the position shown in Figure 4, being pushed upwardly by the plunger 46 which in turn is forced upwardly by the action of spring 52. When the metal sheet S is inserted in the welding machine, it is placed in such position that the upper end of the insulating sleeve extends upwardly through the hole 24 and the surrounding flange 30, which was formed in the sheet in the preceding step of the process. This serves to locate the sheet in the proper position to enable the nut to be welded to it.

The nut N, which is formed of iron or steel and is of the plain square type which can be obtained at the lowest price, is held in the counterbore 64 of the cap of the welding adapter by the magnetic action of the permanent magnet 58. The nut may be fed into position in the counterbore through a chute leading from an overhead hopper, neither of which are shown since they may be of conventional construction, or it may be placed there manually if desired. Also, while in the illustrated embodiment, magnetic means are utilized to hold the nut in position, it may be held by any suitable form of mechanical holding means.

When the nut is being fed into position in the welding adapter 34, the latter is raised to a position slightly higher than shown in Figure 4. After the nut is received in the counterbore 64 and is held therein by the permanent magnet, the adapter is moved downwardly to the position shown in Figure 4, so that the nut fits over the locating pin 42, the pilot portion 44 of which extends up into the threaded hole 65 in the nut. This serves to properly center the nut with relation to the flange 30 of the metal sheet, the diameter of the counterbore 64 being slightly larger than the distance across the corners of the nut, so that the latter may slide laterally a slight amount in the counterbore as it is moved downwardly over the rounded pilot portion 44 of the locating pin.

The next step is to turn on the supply of welding current to the lower platen 32 and the welding adapter 34, and simultaneously move the latter downwardly. Since the metal sheet is resting upon the conducting collar 38, as soon as the bottom faces of the corners of the nut engage the top of the flange 30, the welding current flows between the two, and since there is a limited area of contact, the resistance is relatively high and the portions of the flange where the corners of the nut are resting upon it are heated to the point where they become plastic, allowing the corners of the nut to be forced downwardly through the flange, until the lower faces of these corners come into contact with the upper surface of the sheet S. As the nut is forced downwardly, since it is resting upon the locating pin 42 which in turn is held in the insulating sleeve 40, it forces the latter, and the plunger 46 on which it rests, downwardly against the compression of the spring 52, to the position shown in Figure 5. The controls of the welding machine are so timed that when this point is reached, the welding current is cut off, and the adapter 34 is moved upwardly to the starting position of the cycle of operations, so that another nut may be fed into the counterbore 64.

Figure 6:
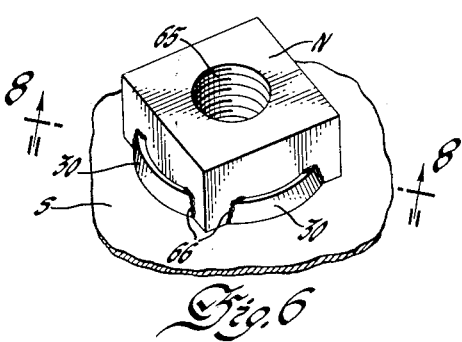
Figure 6 is a perspective view, on a larger scale, of the nut and a portion of the metal sheet, after the nut has been welded thereto.
Figure 7:
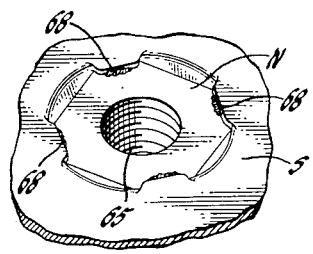
Figure 7 is a perspective view, somewhat similar to Figure 6, but taken from the opposite side of the metal sheet.
Figure 8:
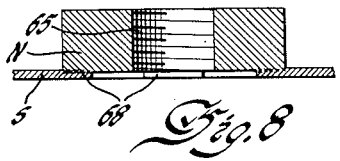
Figure 8 is a sectional view, taken on the line 8—8 of Figure 6.

After the nut has been welded to the metal sheet, the condition of the parts is as indicated in Figures 6 to 8. As shown in Figure 6, some of the portions of the flange 30 under the corners of the nut have become melted down and fused with the sides of the nut, as indicated at 66, the intermediate portions of the flange remaining and embracing the side faces of the nut to assist in preventing twisting of the latter as a bolt or screw is threaded into it. Figure 7 indicates the condition of the parts on the opposite side of the metal sheet, showing that some of the portions of the flange where the corners of the nut have rested upon it are forced down under the corners and become fused to the lower face thereof, as shown at 68, which of course positively holds the nut in place on the metal sheet, and also assists in preventing it from being twisted loose.

It will be understood that this welding action is accomplished rapidly, it taking only a very short time to weld a nut to the sheet, so that the production capacity of each welding machine is very high, which of course reduces the cost per welding operation. The length of time it takes to perform the welding operation depends of course, upon the size of the nut being used and the thickness of the metal sheet it is to be welded to, it taking a somewhat longer time to weld heavier nuts to thicker sheets.

Various tests have shown that nuts welded to metal sheets by this process will withstand several times as much twisting and pulling force before coming loose. In fact, in most of such tests, the nuts did not come loose from the metal sheet, but the portions of the latter where the nuts were welded to them simply pulled out of the remainder of the sheet, before the nut would break loose.

A further function of the locating pin 42 is that since the pilot portion 44 thereof remains in the threaded hole 65 in the nut while the welding operation is taking place, it prevents any of the flash which may result from the welding operation from getting into the threads of the nut.

Figure 5:
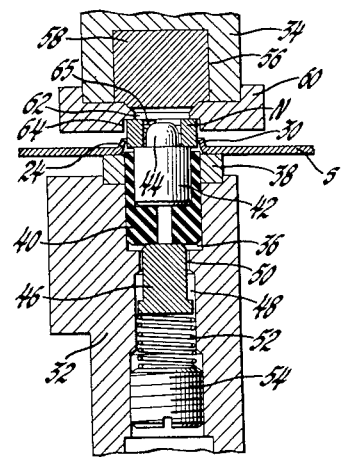
Figure 5 is a view similar to Figure 4, but showing the position of the parts at the completion of the welding operation.

A feature of the welding adapter is that, as shown in Figures 4 and 5, since a space is provided between the lower face of the permanent magnet 58 and the top face of the nut N, the latter cannot become fused to the magnet during the welding operation. The cap 60, which the nut is seated against, is preferably made of copper or some similar material or alloy, to which the nut will not become fused during the welding operation.

In some of the prior art processes where the welding projections are in the form of a plurality of ribs or dimples which are pressed into the metal sheet, care must be taken to insure that the nut is turned to the proper position so that its corners will rest upon these ribs or dimples, in order that the welding operation may be properly performed. In my improved process, this is not necessary due to the fact that the flange 30 is continuous, it being possible to perform the welding operation in any angular position in which the nut happens to be forced down on the flange, it only being necessary to have the nut centered over the hole in the metal sheet, and this is accomplished by the locating pin 42.

While a specific embodiment of my improved process has been shown and described, it will be understood that various changes in details of the operation of the process, and in the construction of the mechanism employed in carrying it out, may be made without departing from the spirit and scope of the appended claims.

I claim:

1. The process for providing a flange around a hole which is formed in a metal sheet and securing a nut thereto, which consists of extruding the sheet at the edge of the hole to form a flange, and thereafter securing a nut to the flange by a welding operation.

2. The process for forming a flange around a hole which is punched in a metal sheet and securing a nut thereto, which consists of extruding the sheet at the edge of the hole during the punching operation to form a flange, and thereafter securing a nut to the flange by a welding operation.

3. The process for forming a flange around a hole which is punched in a metal sheet and securing a nut thereto, which consists of extruding the sheet at the edge of the hole during the punching operation to form a flange, and thereafter securing a nut to the sheet by causing portions of the flange to become welded to the nut.

4. The process for forming a flange around a hole which is punched in a metal sheet and securing a nut thereto, which consists of extruding the sheet at the edge of the hole to form a flange by means of the punch which has formed the hole, and thereafter securing a nut to the flange by a welding operation.

5. The process for forming a flange around a hole which is punched in a metal sheet and securing a nut thereto, which consists of extruding the sheet at the edge of the hole to form a flange by means of the punch which has formed the hole, and thereafter securing a nut to the sheet by causing portions of the flange to become welded to the nut.

6. The process for providing a flange around a hole which is formed in a metal sheet and securing a nut thereto, which consists of extruding the sheet at the edge of the hole to form a flange, holding a nut against the flange in such position that the corners rest thereon, and thereafter performing a welding operation which causes the corners of the nut to become embedded in the flange.

7. The process for providing a flange around a hole which is formed in a metal sheet and securing a nut thereto, which consists of extruding the sheet at the edge of the hole to form a flange, holding a nut against the flange in such position that the corners of the nut extend beyond the flange, and thereafter performing a welding operation which causes the corners of the nut to become embedded in the flange and welded to the sheet.

8. The process for providing a flange around a hole which is formed in a metal sheet and securing a nut thereto, which consists of extruding the sheet at the edge of the hole to form a flange, holding a nut against the flange, and thereafter applying a welding current to the sheet and the nut to cause the flange to become fused with the nut.

9. The process for providing a flange around a hole which is formed in a metal sheet and securing a nut thereto, which consists of extruding the sheet at the edge of the hole to form a flange, holding a nut against the flange in such position that the corners rest thereon, and thereafter applying a welding current to the nut and the sheet to cause the corners of the nut to become embedded in the flange.

10. The process for providing a flange around a hole which is formed in a metal sheet, which consists of extruding the sheet at the edge of the hole to form a flange thereon, holding a nut against the flange in such position that the corners of the nut rest thereon, and thereafter applying pressure and a welding current to the nut and the sheet to cause the corners of the nut to become embedded in the flange.

11. In combination, a metal sheet having a hole formed therein, a flange extruded from the sheet around the edge of said hole, and a nut secured to said sheet by a welding operation which causes the corners of the nut to become embedded in said flange.

12. The process of forming a metal sheet and nut assembly, which process consists of forming an upstanding flange from the sheet immediately adjacent an opening in said sheet, positioning a nut against said flange, and applying heat and pressure to said nut and sheet to soften the portions of the flange immediately adjacent the contacting corners of the nut to cause said corners to cut through the flange and fuse therewith.

13. The process of forming a welded metal sheet and nut assembly to which a bolt is adapted to be secured, which process consists of punching an opening in a metal sheet and extruding a flange therearound, said flange defining said opening and projecting from one face of said sheet, positioning one face of a nut against said flange with the corners of the nut extending radially beyond the flange, the threaded hole in said nut being substantially aligned with the opening in the sheet, and applying pressure and a welding current to said nut and sheet to melt the portions of the flange immediately adjacent said corners of the nut to cause said corners to cut through said flange and become bonded thereto.

14. The method of forming a welded nut and metal panel assembly to which a bolt is adapted to be secured and in which the plate is relatively thin as compared with the thickness of the nut, which process consists of punching a circular hole in a metal panel, extruding the immediate panel edge formed by the hole by the same stamping action to thereby form an annular flange which is generally normal to said panel, positioning a portion of one face of a nut against the edge of said flange with only the adjacent corners of the nut extending radially beyond the flange and with the threaded hole in said nut substantially in coaxial alignment with the hole in the panel, and projection welding said nut and panel together by electrically melting under pressure the portions of the flange which contact said corners of the nut to cause said corners to cut through said flange and be brought into engagement with the surface of the panel radially external of the flange, thereby bonding the adjacent face and side surfaces of the nut to the flange.

15. A metal sheet and nut assembly comprising a metal sheet having an opening therein with the edge of said opening formed to project from one face of said sheet, and a nut having its corners embedded in and extending radially beyond the projecting edge of said opening, said corners being welded to said edge to secure the nut thereto.

16. A metal sheet and nut assembly comprising a metal sheet having an opening therein and a flange defining said opening and projecting from one face of said sheet, and a nut having a generally flat face with the portions of the adjacent corners of said nut embedded in the flange and extending radially beyond the flange to substantially contact the surface of the sheet outside the flange, said corners being fused with said flange to secure the nut thereto.

17. A welded nut and metal panel assembly comprising a relatively thin metal panel having a circular opening therein and an annular flange formed from the edge of said opening and projecting generally normally to one face thereof, and a nut having a substantially flat face with the corners of said nut being pierced through the flange and welded thereto, said corners extending radially outside the flange and being bonded to the adjacent surface of the sheet radially external of the flange.

FRANK M. PRUCHA.

REFERENCES CITED

The following references are of record in the file of this patent:

UNITED STATES PATENTS

| Number | Name | Date |
|---|---|---|
| 1,354,293 | Gravell | Sept. 28, 1920 |
| 1,604,531 | Murray | Oct. 26, 1926 |
| 1,925,753 | Fitch et al. | Sept. 5, 1933 |
| 2,078,694 | Smith | Apr. 27, 1937 |
| 2,213,630 | Gade | Sept. 3, 1940 |
| 2,245,298 | Proctor | June 10, 1941 |
| 2,321,201 | Heilman | June 8, 1943 |
| 2,372,772 | Ellis et al. | Apr. 3, 1945 |
| 2,477,430 | Swanstrom | July 26, 1949 |